Jan. 4, 1944.    C. M. SLOMAN ET AL    2,338,550
TRACTOR TRACK
Filed Nov. 11, 1942    2 Sheets-Sheet 1

INVENTORS
CHERI M. SLOMAN
GEORGE GIUSTI
BY
ATTORNEY

Jan. 4, 1944.   C. M. SLOMAN ET AL   2,338,550
TRACTOR TRACK
Filed Nov. 11, 1942   2 Sheets-Sheet 2

INVENTORS
CHERI M. SLOMAN
GEORGE GIUSTI
BY
ATTORNEY

Patented Jan. 4, 1944

2,338,550

UNITED STATES PATENT OFFICE 2,338,550

TRACTOR TRACK

Cheri M. Sloman, Detroit, Mich., and George Giusti, Los Angeles, Calif., assignors to United States Rubber Company, New York, N. Y., a corporation of New Jersey Application November 11, 1942, Serial No. 465,204

12 Claims. (Cl. 305—10)

This invention relates to tractor tracks and in particular it relates to an endless tractor track formed of separable track units.

Tractor-laying wheels or bands of the endless type are used extensively for armed vehicles and for heavy industrial and agricultural vehicles. Many of the conventional endless type of tracks are formed of tread units associated together in such a manner that it is difficult to remove one or more of the track units for the purpose of replacement. Endless track members in which continuous cables are employed as the inextensible members are such that it is not possible to replace sections of the track.

In accordance with our invention, we provide a tractor track formed of a plurality of identical track units or sections, each of which may be readily associated with an adjacent track unit to form an endless track member. Essentially the invention comprises a plurality of chain links attached to rigid anchoring members and embedded in a rubber composition forming the flexible and wear-resistant portion of the track. By this arrangement the embedded chain links satisfy the high strength requirement of the track and also permit adequate flexing of the track. The members to which the chains are anchored are also embedded in the rubber composition with a sufficient portion of the anchoring members exposed to provide means for connecting adjacent units together.

Among the objects of our invention are to provide a tractor track formed of separable units or sections; to provide a tractor track of separable units which may be quickly and easily assembled or replaced; to provide a tractor track, the units of which may be formed in relatively small molds thereby reducing manufacturing costs; to provide a tractor track to which grousers may be readily assembled; to provide a tractor track in which units thereof may be readily replaced in the field without the need of special tools or equipment; and, to provide a tractor track which may be manufactured expeditiously. These and other objects and advantages will appear more fully in the following detailed description when considered in connection with the accompanying drawings, in which—

Figure 1:
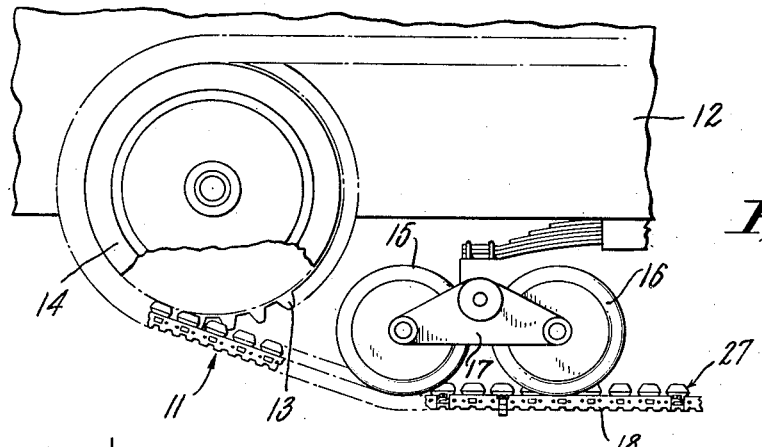
Fig. 1 is a side elevational view of a portion of a tractor track assembled with a portion of a vehicle.
Figure 4:
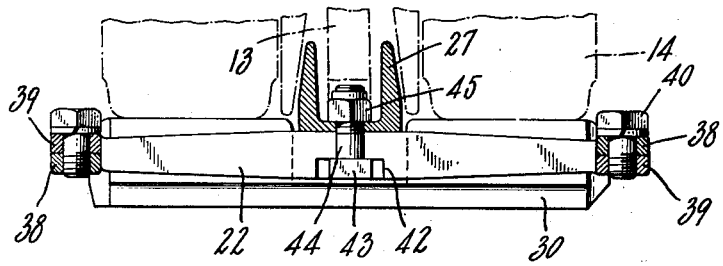
Fig. 4 is a transverse view, partly in section, taken along section IV—IV of Fig. 2.

With reference to the drawings and in particular to Figs. 1 and 4, we show a track 11 associated with a conventional track-laying vehicle 12 including a drive sprocket 13, supporting wheels 14, bogie wheels 15 and 16 and a frame 17 for supporting the bogie wheels. The track 11 is formed of a plurality of units 18.

Each unit 18 comprises cross bars 19 and 20 and end bars 21 and 22 connected by short chains 24 arranged in parallel groups and embedded in rubber composition (artificial or natural) to form parallel spaced ground engaging tread elements 25 and 26. The portions of the cross bars 19 and 20 and end bars 21 and 22 in the spaces between the elements 25 and 26 are provided with lugs 27 for engagement with the drive sprocket 13. The cross bars 20 differ from the cross bars 19 by extending beyond the elements 25 and 26 far enough to have bolt holes 28 for the reception of bolts 29 for securing grousers 30. The units may vary in length according to the number of cross bars used but satisfactory results are obtained by the use of four or six cross bars which provide a tread unit of the length of approximately 16 or 24 inches, respectively.

Each of the cross bars 19 and 20 is provided with outwardly extending bosses 31 and one side of each of the end bars 21 and 22 is provided with similar bosses. The bosses are spaced apart substantially far enough to receive an end of the chain 24. The bosses are provided with aligned openings 32 so that the aligned group on each cross bar may receive a coupling pin 34. The coupling pins are threaded through the chain ends so that there is a metallic connection between each cross bar and end bar whereby the strain on the track is transmitted longitudinally of the track by the chains and cross bars.

Figure 2:
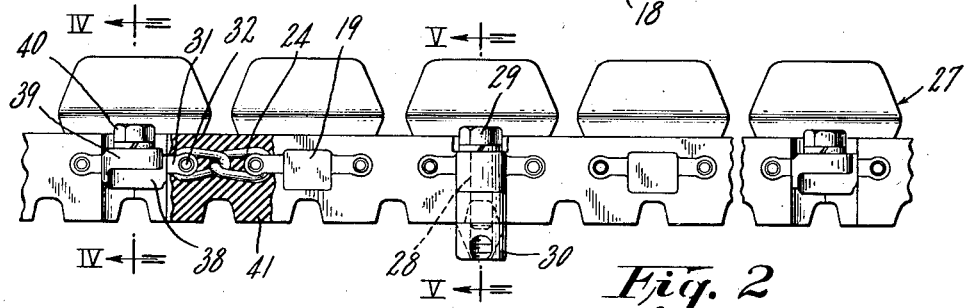
Fig. 2 is a side elevational view, partly in section, of a tractor track unit.

The rubber of the tread elements fills the chain links and is bonded thereto so that the chains 24 are well embedded therein as shown in Fig. 2.

Figure 5:
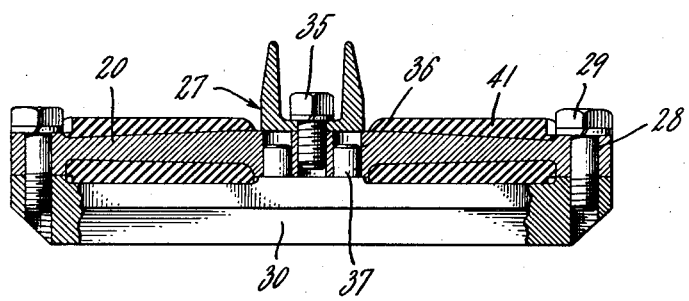
Fig. 5 is a transverse view, partly in section, taken along section line V—V of Fig. 2.

The lugs 27 are bifurcated as shown in Fig. 5 so as to straddle the teeth of the sprocket 13 and serve as a guide therefor. Preferably they are secured to the cross bars 19 and 30 by bolts 35. The bolts are preferably threaded directly into the cross bars 19, and in the case of the cross bars 20, as shown in Fig. 5, the bolts engage the cross bar between openings 36 for the reception of dowl pins 37 formed on the grousers 30.

The construction of the end bars 21 and 22 is identical, except that in assembly they face opposite directions and form, in effect, right and left hand bars. The end bar 21 when associated in complementary position with an end bar 22 of an adjacent similar unit comprises in combination a cross bar substantially similar to the cross bars 19 and 20. A lug 38 extends from each end of the end bar 21. In a similar manner a lug 39 extends from each end of the end bar 22. The lugs are so arranged, as shown in Fig. 2, that the lugs of bar 21 overlap the lugs of bar 22 to permit a bolt 40 to be threaded into the lowermost lug thereby securing the end bars 21 to its adjacent complementary cross bar 22.

Except for one surface of the end bars 21 and 22, the main portions of the cross member and their associated lugs and chain links are embedded in a rubber composition 41. The rubber composition constitutes several functions; it provides a resilient tread wearing surface; and, it embeds the chain in a resilient sealing material thereby preventing any dirt or foreign material from engaging with any of the portions of the unit subjected to relative movement. The rubber composition also provides a smooth and resilient back surface on the track for engaging bogie wheels or other supporting means for the track. It is preferable that the rubber composition become bonded with the metal parts during the vulcanization of the rubber.

Figure 3:
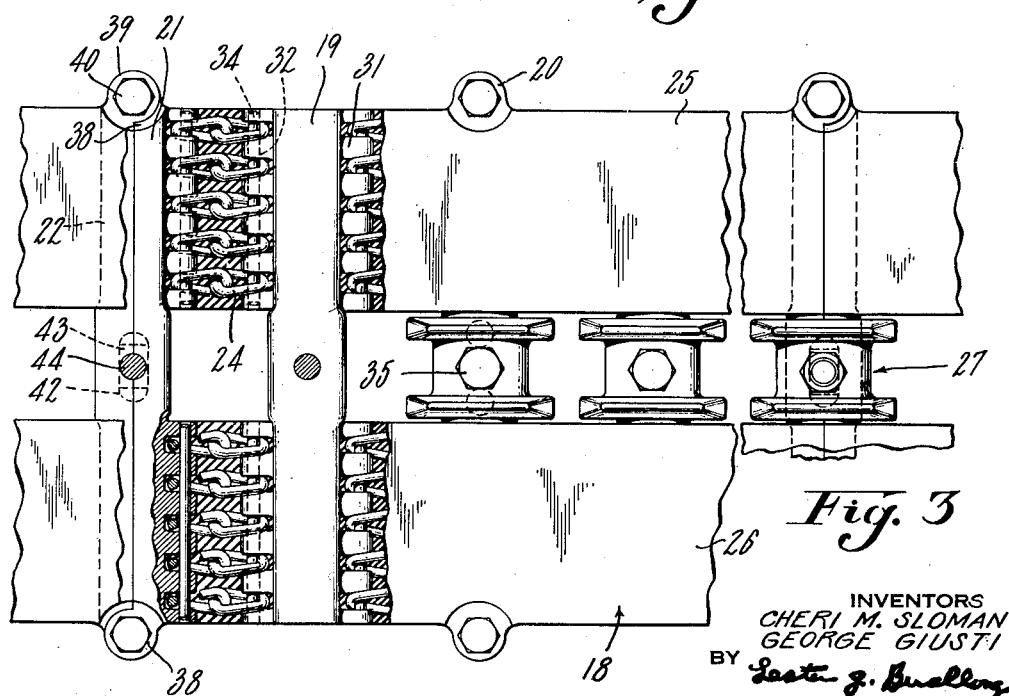
Fig. 3 is a plan view thereof partly in section.

In addition to the end bars 21 and 22 being secured together by the bolts 40, the end bars are also held together by the lug 27. As shown in Figs. 3 and 4, a slot 42 is cut into the under side of the end bars 21 and 22 for the reception of the head 43 of a bolt 44. A nut 45 associated with the bolt 44 completes the assembly for securing the lug 27 with the end bars.

Figure 6:
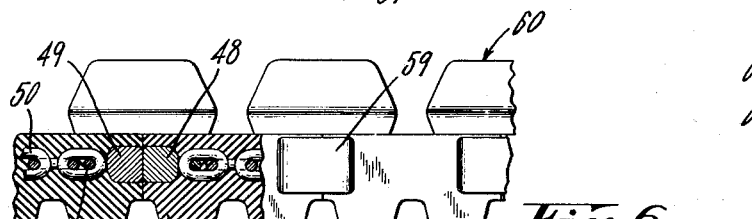
Fig. 6 is a side elevational view, partly in section, of a portion of a track unit of modified form.
Figure 8:
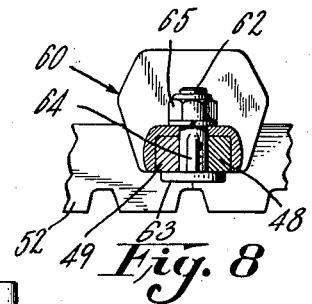
Fig. 8 is an elevational view in detail and in section taken along section line VIII—VIII of Fig. 7.
Figure 7:
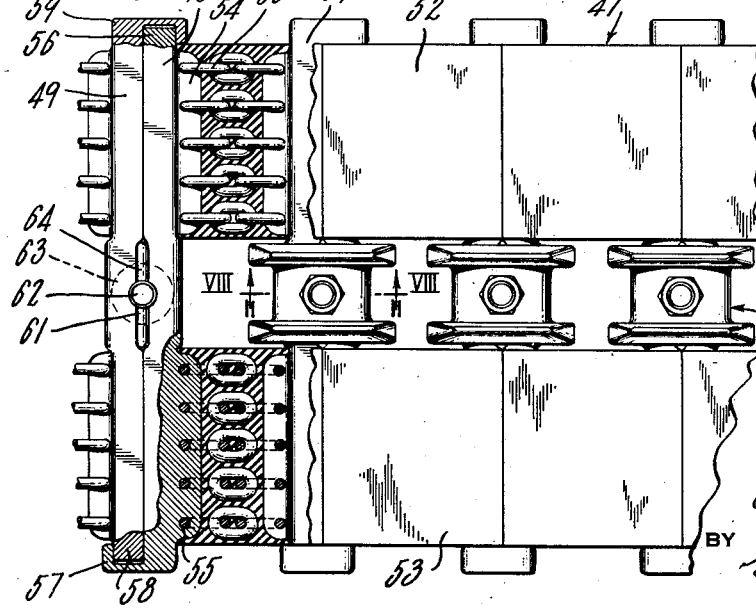
Fig. 7 is a plan view thereof, partly in section.

As a modification of the invention, reference may be had to Figs. 6, 7 and 8. The modification shows a track formed of a plurality of units 47. Each unit 47 comprises end bars 48 and 49 connected by short chains 50 arranged in parallel groups and embedded in a rubber composition (natural or artificial) 51 to form parallel spaced ground engaging tread elements 52 and 53. A ledge 54 extends from the end bars 48 and 49, and holes 55 in the ledge permit the attachment of links of the chain 50 to the ledge. With the exception of the exposed ends, and one side surface and the central portion of the end bars 48 and 49, the entire unit is encased in the rubber composition 51 which is bonded to the metal parts.

At one end of the end bar 48 is a cylindrical portion 56 which projects beyond the side surface of the tread element 52. The opposite end of the end bar 48 includes a cap member 57 positioned so as to engage a cylindrical portion such as 56 on an adjacent corresponding end bar. In a similar manner the end bar 49 is provided with a cylindrical portion 58 and a cap member 59. In assembling tread units together, corresponding end bars are placed in adjacent parallel relation and moved laterally with respect to the tread unit whereupon the cap members engage complementary cylindrical portions to secure the tread units longitudinally together.

The portions of the end bars 48 and 49 in the spaces between the tread elements 52 and 53 are provided with a lug 60 for engagement with the drive sprocket 12. The lug 60 is bifurcated so as to straddle the teeth of the sprocket 13 and serve as a guide therefor. At a point intermediate the ends of the end bars 48 and 49 a slot 61 is formed. A special bolt 62 having a head portion 63 and wings 64 is associated with the end bars so that the projecting wings fill the slot 61. This bolt functions to lock the end bars 48 and 49 in a direction transversely of the track. The bolt 62 projects through the lug 60 and a nut 65 secures the lug to the end bars.

As thus shown and described, we have provided a novel track arrangement of great strength and which is formed of separable units facilitating assembly and replacement.

While we have described a preferred embodiment of our invention, it is to be understood that it is susceptible to various modifications within the spirit of the invention as defined by the appended claims.

Having thus described our invention, what we claim and desire to protect by Letters Patent is:

1. An endless track comprising a plurality of track units, each unit comprising a transversely extending rigid bar positioned at each end of the track unit, a plurality of chain links connecting the bars together, a body of rubber composition encasing the chain links and at least a portion of the bars, means at each end of the bar for connecting the bar of an adjacent similar unit, and means intermediate the length of the bar for locking the bar to the bar of an adjacent similar unit.

2. An endless track comprising a plurality of track units, each unit comprising a transversely extending rigid bar positioned at each end of the track unit, a projection extending along the length of each bar and facing the bar at the opposite end of the unit, a plurality of chain links associated with the projections for connecting the bars together, and a body of rubber composition encasing the chain links and at least a portion of the bars.

3. An endless track comprising a plurality of track units, each unit comprising a transversely extending rigid bar positioned at each end of the track unit, a plurality of lugs extending from the bars, a plurality of chain links positioned between the lugs and extending to the lugs of an adjacent bar, a rod extending through the lugs and through the chain links for anchoring the chains to the bars, and a body of rubber composition encasing the chain links and at least a portion of the bars.

4. An endless track comprising a plurality of track units, each unit comprising a plurality of transversely extending rigid bars positioned in spaced parallel relation and including a bar at each end of the track unit, a plurality of lugs extending from the bars, a plurality of chain links positioned between the lugs and extending to the lugs of an adjacent bar, a rod extending through the lugs and through the chain links for anchoring the chains to the bars, and a body of rubber composition encasing the chain links and at least a portion of the bars.

5. An endless track comprising a plurality of track units, each unit comprising a transversely rigid bar positioned at each end of the track unit, a plurality of chain links connecting the bars together, a body of rubber composition encasing the chain links and at least a portion of the bars, one end of the bar projecting beyond the rubber embedment, and a cap member extending from the opposite end of the bar and adapted to fit over the end of a complementary end projection of the bar of an adjacent similar unit.

6. An endless track comprising a plurality of track units, each unit comprising a transversely extending rigid bar positioned at each end of the track unit, a plurality of chain links connecting the bars together, a body of rubber composition encasing the chain links and at least a portion of the bars, one end of the bar projecting beyond the rubber embedment, a cap member extending from the opposite end of the bar and adapted to fit over the end of a complementary end projection of the bar of an adjacent similar unit, and means intermediate the length of the bar for locking the bar to the bar of an adjacent similar unit.

7. An endless track comprising a plurality of track units, each unit comprising a transversely rigid bar positioned at each end of the track unit, a plurality of chain links connecting the bars together, a body of rubber composition encasing the chain links and at least a portion of the bars, and a boss extending from the ends of the end bars, the bosses at the opposite ends being positioned to permit complementary engagement with similar units.

8. An endless track comprising a plurality of track units, each unit comprising a transversely extending rigid bar positioned at each end of the track unit, a plurality of chain links connecting the bars together, a body of rubber composition encasing the chain links and at least a portion of the bars, a boss extending from the ends of the end bars, the bosses at the opposite ends being positioned to permit complementary engagement with similar units, and means intermediate the length of the bar for locking the bar to the bar of an adjacent similar unit.

9. An endless track comprising a plurality of track units, each unit comprising a transversely extending rigid bar positioned at each end of the track unit, a projection extending along the length of each bar and facing the bar at the opposite end of the unit, a plurality of chain links associated with the projections for connecting the bars together, a body of rubber composition encasing the chain links and at least a portion of the bars, and means at each end of the bar for connecting the bar to the bar of an adjacent similar unit.

10. An endless track comprising a plurality of track units, each unit comprising a transversely extending rigid bar positioned at each end of the track unit, a projection extending along the length of each bar and facing the bar at the opposite end of the unit, a plurality of chain links associated with the projections for connecting the bars together, a body of rubber composition encasing the chain links and at least a portion of the bars, means at each end of the bar for connecting the bar to the bar of an adjacent similar unit, and means intermediate the length of the bar for locking the bar to the bar of an adjacent similar unit.

11. An endless track comprising a plurality of track units, each unit comprising a transversely extending rigid bar positioned at each end of the track unit, a plurality of lugs extending from the bars, a plurality of chain links positioned between the lugs and extending to the lugs of an adjacent bar, a rod extending through the lugs and through the chain links for anchoring the chains to the bars, a body of rubber composition encasing the chain links and at least a portion of the bars, and means at each end of the bar for connecting the bar to the bar of an adjacent similar unit.

12. An endless track comprising a plurality of track units, each unit comprising a transversely extending rigid bar positioned at each end of the track unit, a plurality of lugs extending from the bars, a plurality of chain links positioned between the lugs and extending to the lugs of an adjacent bar, a rod extending through the lugs and through the chain links for anchoring the chains to the bars, a body of rubber composition encasing the chain links and at least a portion of the bars, means at each end of the bar for connecting the bar to the bar of an adjacent similar unit, and means intermediate the length of the bar for locking the bar to the bar of an adjacent similar unit.

CHERI M. SLOMAN.
GEORGE GIUSTI.